(12) United States Patent
Tyagi et al.

(10) Patent No.: US 11,443,049 B2
(45) Date of Patent: *Sep. 13, 2022

(54) SYSTEMS AND METHODS FOR SECURELY HANDLING PRIVATE DATA IN A CLOUD ENVIRONMENT

(71) Applicant: Verizon Patent and Licensing Inc., Arlington, VA (US)

(72) Inventors: Paritosh Tyagi, Boyds, MD (US); Ashish Sardesai, Ashburn, VA (US); Dante J. Pacella, Charles Town, WV (US); Venkata Josyula, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

This patent is subject to a terminal disclaimer.

(21) Appl. No.: 16/722,840

(22) Filed: Dec. 20, 2019

(65) Prior Publication Data

US 2021/0049284 A1 Feb. 18, 2021

Related U.S. Application Data

(63) Continuation-in-part of application No. 16/537,832, filed on Aug. 12, 2019.

(51) Int. Cl.
*G06F 21/60* (2013.01)
*G06F 21/53* (2013.01)
*G06F 21/62* (2013.01)

(52) U.S. Cl.
CPC ............ *G06F 21/602* (2013.01); *G06F 21/53* (2013.01); *G06F 21/629* (2013.01)

(58) Field of Classification Search
CPC ....... G06F 21/602; G06F 21/53; G06F 21/629
See application file for complete search history.

(56) References Cited

U.S. PATENT DOCUMENTS 10,783,270 B2 * 9/2020 Ithal .................... G06F 16/2255
10,826,682 B2 * 11/2020 Subramaniam ......... G06F 21/10
(Continued)

OTHER PUBLICATIONS

"Mnist data set", https://www.tensorflow.org/datasets/catalog/mnist. 3 pages, Last updated May 21, 2020.
(Continued)

*Primary Examiner* — Joseph P Hirl
*Assistant Examiner* — Stephen T Gundry

(57) ABSTRACT

Systems and methods described herein securely compute private data on a cloud platform. A network device in the cloud platform obtains a product or service description from a first user. The description includes a combination of public data and encrypted private data based on a first encryption key. The network device receives a query from an end device of a second user and retrieves, based on the query, the product or service description. The network device forwards the description to a trusted execution environment (TEE) instance for decryption of the encrypted private data, processing of the private data, and re-encryption of the private data with a second encryption key. The network device receives the re-encrypted private data from the TEE instance and assembles the re-encrypted private data and the public data into a query response for presentation on the end device. The network device sends, to the end device, the query response including the re-encrypted private data and the public data.

20 Claims, 10 Drawing Sheets

(56) References Cited

U.S. PATENT DOCUMENTS

| | | | |
|---|---|---|---|
| 10,902,133 B2* | 1/2021 | Williams | G06F 21/6245 |
| 10,956,585 B2* | 3/2021 | Ortiz | H04L 9/0844 |
| 11,074,218 B2* | 7/2021 | Faith | G06Q 10/00 |
| 2017/0201498 A1 | 7/2017 | Baig et al. | |
| 2017/0264619 A1 | 9/2017 | Narayanaswamy et al. | |
| 2019/0362083 A1 | 11/2019 | Ortiz et al. | |
| 2020/0014527 A1* | 1/2020 | Subramaniam | H04L 9/0825 |
| 2020/0028926 A1 | 1/2020 | Sprague et al. | |
| 2020/0076578 A1 | 3/2020 | Ithal et al. | |
| 2020/0097679 A1 | 3/2020 | Fisse et al. | |
| 2020/0134200 A1* | 4/2020 | Williams | H04L 9/0827 |
| 2020/0159961 A1* | 5/2020 | Smith | G06K 9/6232 |
| 2020/0204527 A1* | 6/2020 | Vass | G06Q 20/3567 |
| 2020/0250295 A1* | 8/2020 | Padmanabhan | G06F 21/6254 |
| 2020/0259792 A1* | 8/2020 | Devarajan | H04L 43/04 |
| 2020/0344270 A1* | 10/2020 | Nilsson | G06F 9/45558 |
| 2020/0366653 A1 | 11/2020 | Caceres et al. | |
| 2021/0004479 A1 | 1/2021 | Ithal et al. | |
| 2021/0034602 A1* | 2/2021 | Levacher | G06F 16/122 |
| 2021/0034608 A1* | 2/2021 | Antonatos | G06F 16/254 |
| 2021/0049284 A1* | 2/2021 | Tyagi | G06F 21/629 |
| 2021/0136041 A1* | 5/2021 | Foxhoven | H04L 9/3263 |
| 2021/0334408 A1 | 10/2021 | Walcott | |
| 2021/0377222 A1* | 12/2021 | Sharma | H04L 67/42 |
| 2021/0406386 A1* | 12/2021 | Ortiz | G06F 21/604 |
| 2022/0021728 A1* | 1/2022 | Kelly | H04L 63/0807 |

OTHER PUBLICATIONS

"Palisade Homomorphic Encryption Software Library", An Open-Source Lattice Crypto Software Library, https://palisade-crypto.org/. [Accessed Apr. 20, 2020].

"TF-encrypted", https://tf-encrypted.io/. [Accessed Apr. 20, 2020].

Albrecht, et al., "Homomorphic Encryption Standard", http://homomorphicencryption.org/wp-content/uploads/2018/11/HomomorphicEncryptionStandardv1.1.pdf. [Accessed Apr. 20, 2020]. 33 pages, Nov. 21, 2018.

Bajard, et al., "A Full RNS Variant of FV like Somewhat Homomorphic Encryption Schemes", International Conference on Selected Areas in Cryptography, 29 pages, 2016.

Beaver, et al., "The Round Complexity of Secure Protocols (Extended Abstract)", 22nd Annual ACM Symposium on Theory of Computing, pp. 503-513, 1990.

Ben-Or, et al., "Completeness Theorems for Non-Cryptographic Fault-Tolerant Distributed Computation (Extended Abstract)", 20th Annual ACM Symposium on Theory of Computing, pp. 1-10, 1988.

Brakerski, et al., "(Leveled) Fully Homomorphic Encryption without Bootstrapping", ACM Transactions on Computation Theory, vol. 6(3), No. 13, pp. 309-325, 2014.

Brakerski, "Fully Homomorphic Encryption without Modulus Switching from Classical GapSVP", Advances in Cryptology, p. 868-886, 2012.

Cheon, et al., "Homomorphic Encryption for Arithmetic of Approximate Numbers", Cryptology ePrint Archive: Report 2016/421, 2016. [Online]. Available: https://eprint.iacr.org/2016/421. [Accessed Apr. 20, 2020].

Columbus, "Roundup Of Machine Learning Forecasts And Market Estimates, 2020", https://www.forbes.com/sites/louiscolumbus/2020/01/19/roundup-of-machine-learning-forecasts-and-market-estimates-2020/#5db5ecc65c02. © 2020 Forbes Media LLC., 22 pages, Jan. 19, 2020.

Dwork, et al., "The Algorithmic Foundations of Differential Privacy", Foundations and Trends(R) in Theoretical Computer Science vol. 9, Nos. 3-4 (2014) 211-407.

Evans, et al., "A Pragmatic Introduction to Secure Multi-Party Computation", https://securecomputation.org/docs/pragmaticmpc.pdf., NOW Publishers, 2018., 181 pages, (This version: Apr. 15, 2020).

Goldreich, et al., "How to play any Mental Game or A Completeness Theorum for Protocols with Honest Majority", 19th Annual ACM Symposium on Theory of Computing, pp. 218-229, 1987.

Kolesnikov, "Gate Evaluation Secret Sharing and Secure One-Round Two-Party Computation", Advances in Cryptology—ASIACRYPT 2005, p. 136-155, 2005.

Lecun, et al., "Gradient-Based Learning Applied to Document Recognition", http://vision.stanford.edu/cs598_spring07/papers/Lecun98.pdf, Proceedings of the IEEE, 46 pages, Nov. 1998.

Meehan, "Data Privacy Will Be The Most Important Issue In The Next Decade", https://www.forbes.com/sites/marymeehan/2019/11/26/data-privacy-will-be-the-most-important-issue-in-the-next-decade/#5e0eaa841882., © 2020 Forbes Media LLC., 5 pages, Nov. 26, 2019.

Polyakov, et al., "An improved rns variant of the bfv homomorphic encryption scheme", RSA(R) Conference 2019, San Francisco, CA, Moscone Center, Mar. 4-8, 2019.

Reinsel, et al., "Data Age 2025", The Digitization of the World From Edge to Core, IDC White Paper, Doc#US44413318, 28 pages, Nov. 2018.

Song, et al., "Stochastic Gradient Descent with differentially private updates", http://cseweb.ucsd.edu/~kamalika/pubs/scs13.pdf., 4 pages, 2013.

Stehlé, et al., "Making NTRU as Secure as Worst-Case Problems over Ideal Lattices", Advances in Cryptology—EUROCRYPT, vol. 6632, no. Lecture Notes in Computer Science, p. 27-47, 2011.

Thaine, "Perfectly Privacy-Preserving AI", https://towardsdatascience.com/perfectly-privacy-preserving-ai-c14698f322f5., 10 pages, Jan. 1, 2020.

Wagh, et al., "SecureNN: 3-Party Secure Computation for Neural Network Training", Proceedings on Privacy Enhancing Technologies, vol. 2019: Issue 3, 24 Pages.

Yao, "Protocols for Secure Computations (Extended Abstract)", 23rd Annual Symposium on Foundations of Computer Science, pp. 160-164, IEEE, 1982.

* cited by examiner

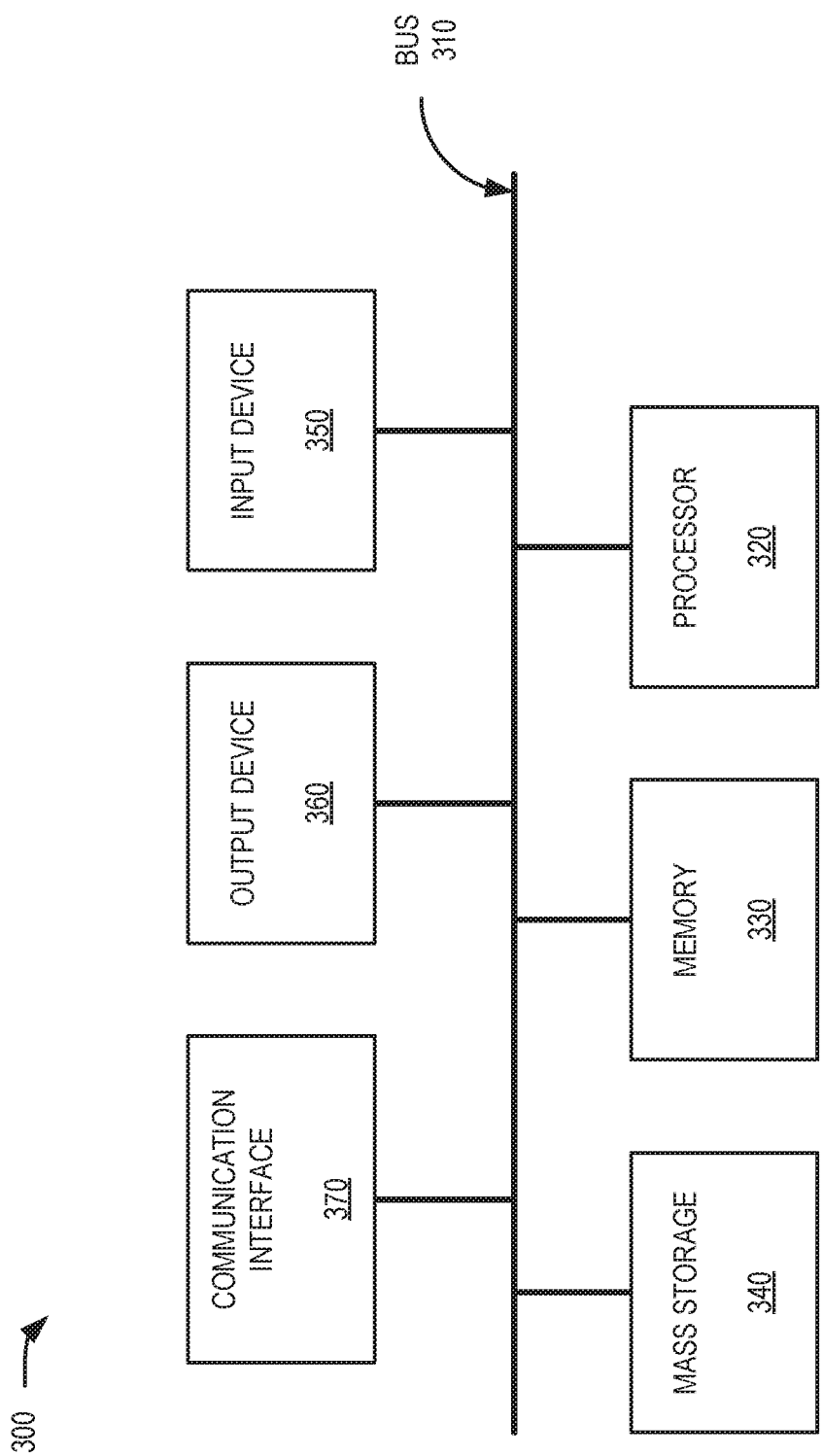

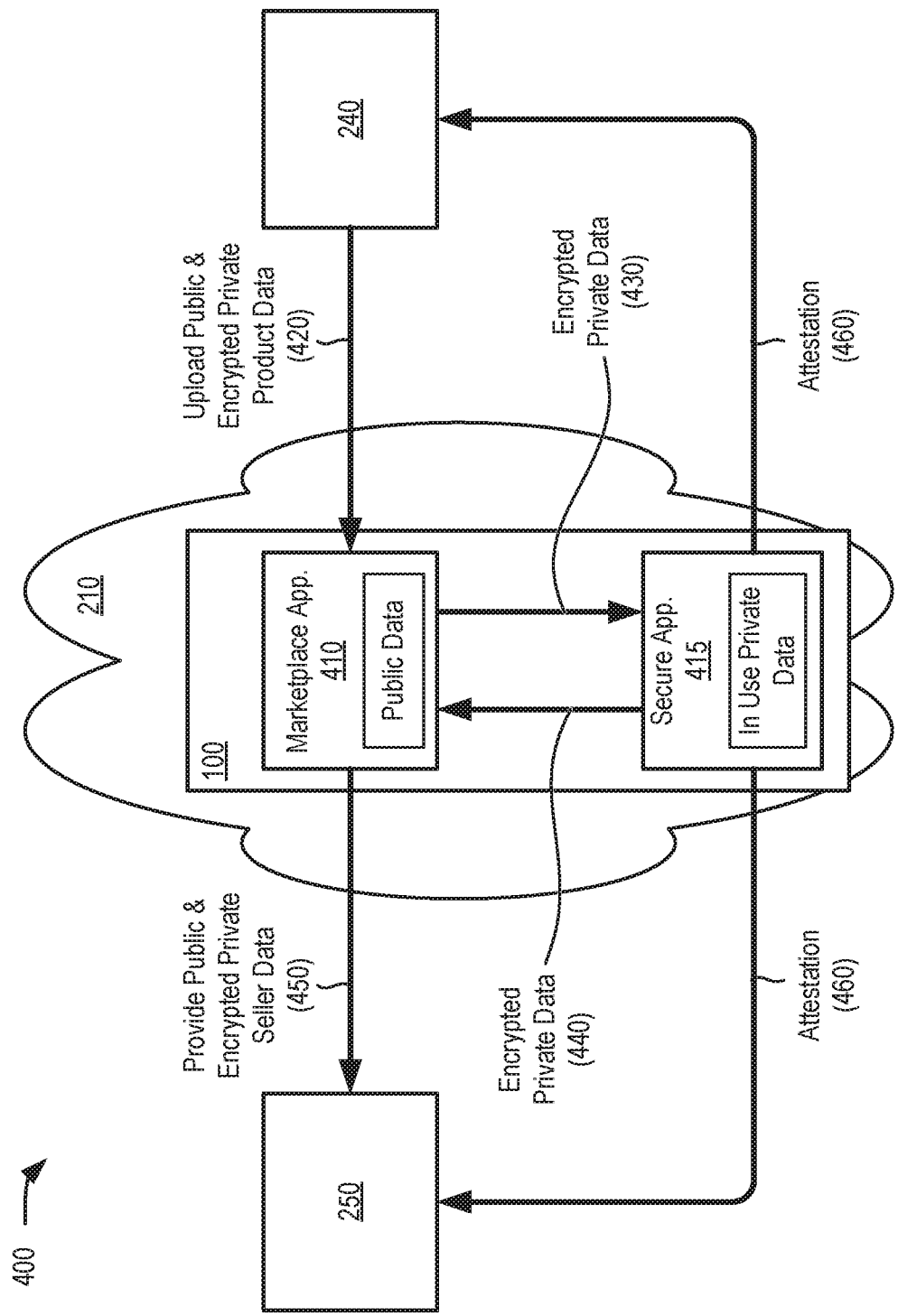

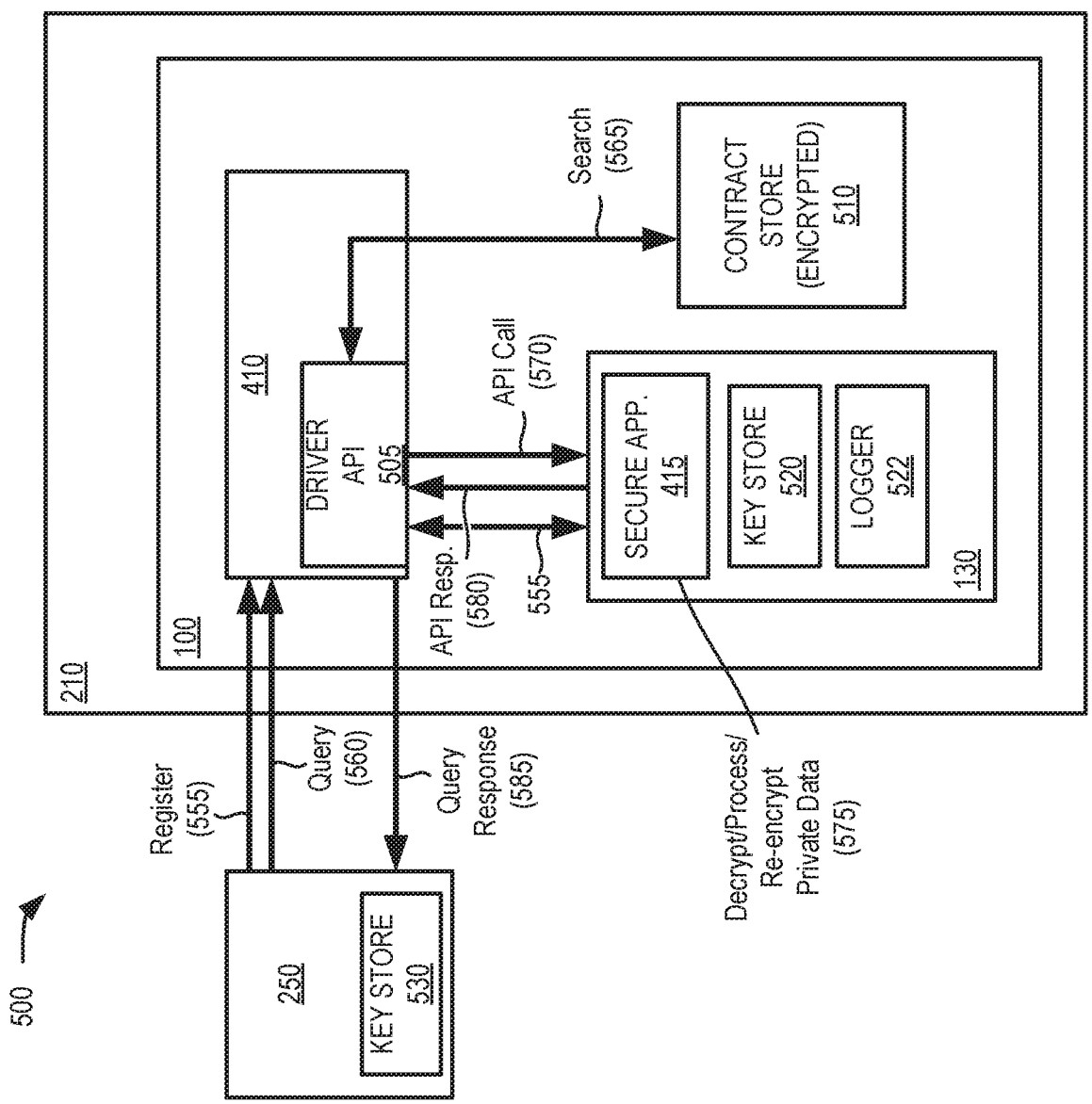

SYSTEMS AND METHODS FOR SECURELY HANDLING PRIVATE DATA IN A CLOUD ENVIRONMENT

RELATED APPLICATION

This application is a continuation-in-part of U.S. patent application Ser. No. 16/537,832, filed on Aug. 12, 2019, and titled "System and Methods for Providing Data Analytics for Secure Cloud Compute Data," the contents of which are incorporated herein by reference.

BACKGROUND

Cloud computing provides on-demand delivery of compute power, storage, applications, and other resources via the Internet. Some e-commerce models use hosted cloud computing applications to manage business to business (B2B), business to business to consumer (B2B2C), or business to consumer (B2C) transactions. In some of these cases, the host platform provider may be a competitor of the business participants. In other cases, the participant's data may be highly confidential and/or valuable. Thus, to attract these participants, the host platform provider needs to be able to provide guarantees to the business participants regarding integrity and security of private data for the entire data life-cycle.

BRIEF DESCRIPTION OF THE DRAWINGS

FIG. 3 is a block diagram illustrating exemplary components of a device that may correspond to the network elements and customer devices depicted in the environment of FIGS. 1 and 2;

FIG. 4 is a diagram of exemplary communications for managing private data in a portion of the network environment of FIG. 2;

FIG. 5B is a diagram of exemplary communications for a buyer to obtain query responses including private seller data on a cloud platform using a TEE, according to an implementation described herein;

DETAILED DESCRIPTION OF PREFERRED EMBODIMENTS

Figure 1:
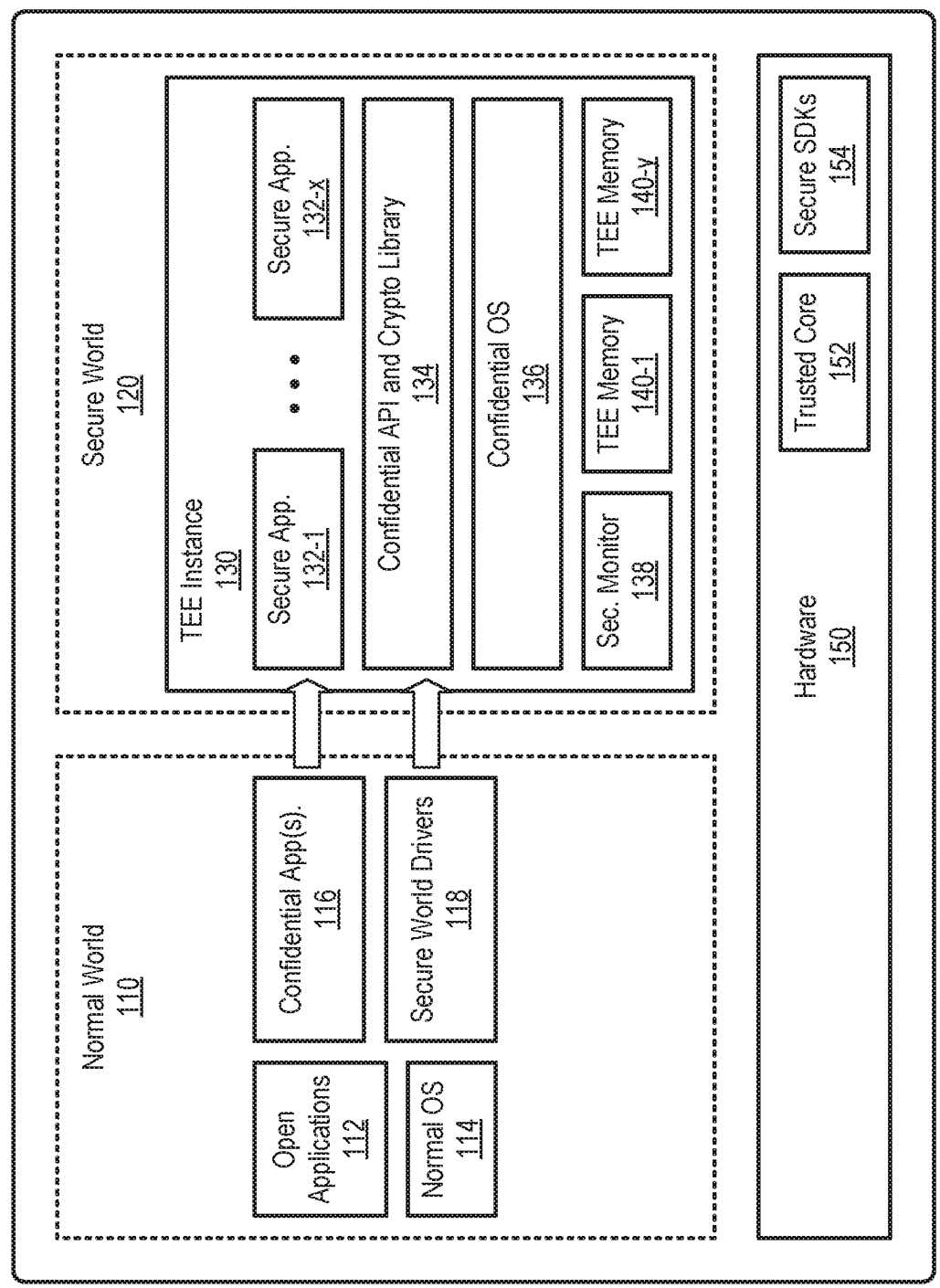
FIG. 1 is a block diagram of a network element for an exemplary secure cloud compute environment according to an implementation described herein.

The following detailed description refers to the accompanying drawings. The same reference numbers in different drawings may identify the same or similar elements.

Systems and methods described herein securely compute private data for an application hosted on a cloud platform. A secure cloud computing environment (referred to herein as secure cloud compute) may provide a data privacy solution enabled by Trusted Execution Environments (TEE) in a cloud platform. Secure cloud compute requires complex key management, encrypted storage, and a hardware based memory isolation mechanism for trusted execution and software that isolates a "secure world" from a "normal world." In these environments, even the platform operators cannot access the private data being acted upon and stored within the secure world.

Businesses that perform e-commerce transactions typically generate private data, such as competitive pricing, discount data, promotional data, and other product or service characteristics. To protect confidentiality of private data in secure cloud compute, a hosted service may execute at least a portion of software instructions within a TEE, a secure element (SE), or other secure hardware/software that is isolated from other network components.

Typically, a TEE will have "secure world" components connected to a larger system that has "normal world" (or non-secure world) components. In these examples, secure data is unencrypted only within the secure world. The secure world runs its own trusted OS and trusted applications. The main system's kernel, as well as any normal world systems, does not have access to the trusted OS and applications running within the secure world environment. In addition, each trusted application in the secure world can be isolated from other trusted applications.

Businesses require confidentiality in the transformation of transactional data such that a cloud platform operator and other buyers and sellers should not have knowledge of key aspects of a transaction, like pricing or discounts. As an example, a marketplace service may be hosted by a cloud service provider that also competes with sellers using the marketplace. If certain transactional data, such as bids or discounts offered to particular customers by a seller, becomes accessible to the cloud service provider, the cloud service provider may gain a competitive advantage (to underbid the seller, for example). Thus, sellers may require a cloud service provider to guarantee the confidentiality of the seller's private data (e.g., transactional data) for the entire data life-cycle. The data life-cycle may include data "at rest," data "in transit," and data "in use," as described further herein.

Systems and methods described herein provide for comprehensive protection of private data for business participants using a cloud platform. The systems and methods may provide a structure to ensure end-to-end data protection for data "at rest," data "in transit," and data "in use" on the cloud platform. According to an implementation, a network device in the cloud platform obtains a product or service description from a first user a seller). The description includes a combination of public data and encrypted private data based on the seller's encryption key. The network device receives a query from an end device of a second user (e.g., a buyer) and retrieves, based on the query, the product or service description. The network device forwards the product or service description to a TEE instance for decryption of the encrypted private data, processing of the private data, and re-encryption of the private data using a second encryption key associated with the buyer. The network device receives the re-encrypted private data from the TEE instance and assembles the re-encrypted private data and the public data into a query response for presentation on the buyer device.

The network device sends, to the buyer device, the query response including the re-encrypted private data and the public data.

FIG. 1 is a block diagram of a network element 100 for an exemplary secure cloud compute environment according to an implementation described herein. Network element 100 may include, for example, a network device, server device, a virtual private server, a virtual network function, etc. As shown in FIG. 1, network element 100 may include a cloud-based application to provide compute and storage services that are divided between a normal world 110 and a secure world 120.

Normal world 110 may include open applications 112, a normal operating system (OS) 114, applications requiring confidentiality 116 (also referred to as confidential applications 116), and secure world drivers 118. Open applications 112 may include applications or services for client devices that do not use private customer information and, accordingly, do not require any interface with secure world 120. Open applications 112 may be accessed using normal OS 114, which similarly does not require any interface with secure world 120. According to implementations described herein, normal world 110 may include secure world drivers 118 that can communicate with the secure world 120 and confidential applications 116, which may have been written to rely on confidentiality provided by secure applications 132 in secure world 120.

Confidential application 116 may include applications that may require collecting, generating, and/or storing private data (e.g., data that a customer/business may not want a platform operator, such a cloud service provider, to see). For example, confidential applications 116 may enable transactions, auctions, and exchanges between buyers and sellers. Confidential applications 116 may interface with a secure application (e.g., one of secure applications 132) in secure world 120 to have transactions and private data managed in a trusted execution environment (e.g., TEE instance 130, described below). Secure world drivers 118 may include software to access resources in secure world 120 via confidential application programming interfaces (APIs) and cryptographic library 134.

Secure world 120 may include one or more TEE instances 130 (also referred to herein as a "secure enclave"). TEE instance 130 is a secure environment within, for example, container of network element 100. The TEE instance 130 may run isolated from the main system using a parallel operating system (e.g., confidential OS 136) and specific drivers. Each TEE instance 130 may include one or more secure applications 132-1 through 132-x (referred to herein generically as secure application 132), a confidential API and cryptography library 134, confidential OS 136, a security monitor 138, and TEE memories 140-1 through 140-y. Secure application 132 may include a service or microservice for e-commerce services that use private customer information and, accordingly, require interfaces to secure execution and storage. Secure application 132 may be accessed using confidential OS 136, which similarly does not interface with normal world 110.

According to implementations described herein, confidential applications 116 may direct a transaction request to secure application 132 to, for example, access, process, or transform transactional data. The same or a different secure application 132 may decrypt private information from the transactional data, perform processing (e.g., to apply adjustments, discounts, incentives, etc.), and re-encrypt the modified private data. Secure application 132 may export the re-encrypted data to confidential applications 116 outside of TEE instance for responses to a customer.

Hardware 150 may include physical memory and processing components of network element 100 that can be configured to spin-up or tear-down a virtual entity (e.g., a containerized instance of normal world 110 and secure world 120) for a customer. According to an exemplary implementation, a cloud network (e.g., cloud platform 210, described below) may share the resources of network element 110 among multiple virtual entities.

According to an implementation, hardware 150 may include a trusted core 152 and secure software development kits (SDKs) 154. Trusted core 152 may, for example, be partitioned to execute multiple virtual entities that can be assigned different normal worlds (e.g. normal world 110) and secure worlds (e.g., secure world 120) for different customers. SDKs 154 may assist and/or enable users to develop software applications for various end devices (e.g., seller devices 240 and/or buyer devices 250 in FIG. 2) to conduct secure transactions using cloud platform 210. In one implementation, SDKs 154 may be used to develop software/templates to identify private information fields and/or other private data, so that secure world 120 may safely decrypt, process, and re-encrypt the private data in accordance with customer instructions.

The number and arrangement of components, illustrated in FIG. 1, is provided for explanatory purposes. In practice, additional components, fewer components, different components, or differently-arranged components than those illustrated in FIG. 1 may be used. Also, in some implementations, one or more of the displayed components may perform one or more functions described as being performed by another one or more of the other components.

Figure 2:
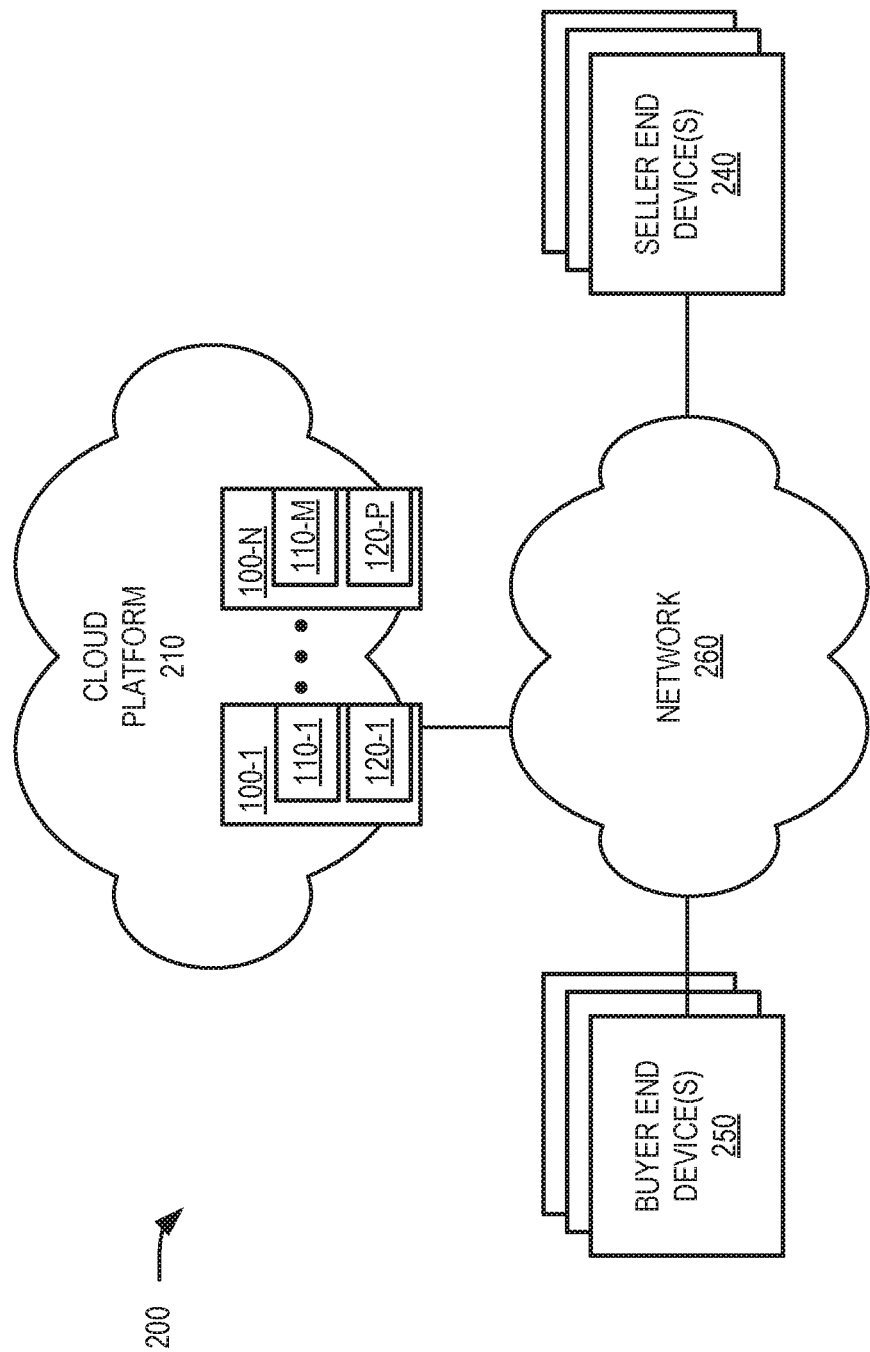
FIG. 2 is a diagram of an exemplary network environment in which network elements of FIG. 1 may be deployed.

FIG. 2 is a diagram of an exemplary network environment 200 in which network element 100 may be deployed. Network environment 200 may include a cloud platform 210, seller devices 240, and buyer devices 250, all interconnected by a network 260.

Cloud platform 210 may include a service or an application-layer network or another type of network that hosts a user device application or service. According to an implementation, cloud platform 210 may provide cloud platform services for a specific service provider network (e.g. Amazon Web Services (AWS), Microsoft Azure, Google Cloud, IBM IOT Bluemix, etc.). Depending on the implementation, cloud platform 210 may include various network devices that provide various applications, services, or other type of user device assets, such as servers (e.g., web, application, cloud, etc.), mass storage devices, data center devices, and/or other types of network services pertaining to various network-related functions.

Cloud platform 210 may be implemented using one or multiple technologies including, for example, network function virtualization (NFV), software defined networking (SDN), cloud computing, or another type of network technology. Depending on the implementation, cloud platform 210 may include, for example, virtualized network functions (VNFs), multi-access (MA) applications/services, and/or servers. In addition to network elements 100, cloud platform 210 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

As described above in connection with FIG. 1, according to an implementation, cloud platform 210 may include multiple network elements 100, each configured with one or more normal world 110 and one or more secure world 120. According to an implementation, secure world 120 may include a hardware-based memory and compute isolation mechanism to protect private data from the OS, firmware and all outside interactions used for normal world 110. Cloud platform 210 may use network elements 100 to provide multiple market place applications that can support, for example, B2B, B2B2C, and/or B2C transactions with guaranteed end-to-end protection for data "at rest," data "in transit," and data "in use" on cloud platform 210.

Seller devices 240 and buyer devices 250 may include similar types of devices, referred to collectively as end devices 240/250. Seller devices 240 may include end devices used by sellers for e-commerce transactions, while buyer devices 250 may include end devices used by buyers for e-commerce transactions. End device 240/250 may include a computational or communication device. End device 240/250 may include, for example, a tablet computer, a smartphone, a personal computer, a laptop computer, a personal communications system (PCS) terminal (e.g., a smartphone that may combine a cellular radiotelephone with data processing and data communications capabilities), a gaming console, a global positioning system (GPS) device, a content recording device (e.g., a camera, a video camera, etc.), or other types of computational or communication devices. In another implementation, end device 240/250 may include an Internet of Things (IoT) device or machine-type communication (MTC) device for collecting and transmitting data. End device 240/250 may be used, for example, to initiate or conduct a transaction using a network element 100 that includes service data and/or private information.

According to one implementation, seller device 240 may include a client application that interfaces with network element 100 to perform secure cloud compute exchanges for sellers. Similarly, buyer device 250 may include the same or different client application that interfaces with network element 100 to perform secure cloud compute exchanges for buyers. As used herein, the term "seller" is intended to be broadly interpreted to include seller device 240 and/or a person using seller device 240. Similarly, the term "buyer" is intended to be broadly interpreted to include buyer device 250 and/or a person using buyer device 250.

Network 260 may include a local area network (LAN); an intranet; the Internet; a wide area network (WAN), such as a cellular network, a satellite network, a fiber optic network, a private WAN, or a combination of the Internet and a private WAN; etc., that is used for exchanging control signals or transporting data. Although shown as a single element in FIG. 2, network 260 may include a number of separate networks that provide services to other components of FIG. 2.

In FIG. 2, the particular arrangement and number of components of network environment 200 are illustrated for simplicity. In practice there may be more cloud platforms 210, end devices 240/250, or networks 260. For example, there may be hundreds or thousands of network elements 100 in cloud platform 210.

FIG. 3 is a block diagram depicting exemplary components of a device 300 that may correspond to one of the of devices in cloud platforms 210, end devices 240/250, or devices in networks 260. Devices in cloud platforms 210, end devices 240/250, or devices in networks 260 may use one or more devices 300. Device 300 may include a bus 310, a processor 320, a memory 330, a mass storage 340, an input device 350, an output device 360, and a communication interface 370.

Bus 310 includes a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities and providing applications to, for example, a plurality of end devices 250 which are communicatively coupled to cloud platform 210.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of redundant array of independent disks (RAID) arrays. Mass storage device 340 may be suitable for storing files associated with applications 112/132.

Input device 350, which may be optional, can allow an operator to input information into device 300, if required. Input device 350 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 350. Output device 360 may output information to an operator of device 300. Output device 360 may include a display (such as an LCD), a printer, a speaker, and/or another type of output device. In some embodiments, device 300 may be managed remotely and may not include output device 360.

Communication interface 370 may include a transceiver that enables device 300 to communicate over network 260 with other devices and/or systems. The communications interface 370 may be for wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a Wi-Fi) card for wireless communications. Communication interface 370 may also include a USB port for communications over a cable, a Bluetooth wireless interface, an RFID interface, and/or a Near Field Communications (NFC) wireless interface.

As described below, device 300 may perform certain operations relating to secure cloud compute services. Device 300 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3.

FIG. 4 is a diagram of exemplary communications for managing private data in a cloud environment in a portion 400 of the network environment of FIG. 2. In the example of FIG. 4, a network element 100 in cloud platform 210 may be configured with a marketplace application 410 to facilitate transactions between a buyer (e.g., using buyer device 250) and a seller (e.g., using seller device 240).

As shown in FIG. 4, seller device 240 may upload (e.g., via a web-based application interface) public and encrypted private product data 420, such as product features (public) and private characteristics. The encrypted private data 430 may be passed through marketplace application 410 (corresponding, e.g., a confidential app 116 in normal world 110) to a secure application 415. Secure application 415 may correspond to a secure application 132 on TEE instance 130 in secure world 120. A secure enclave (e.g., a TEE instance 130) in secure world 120 may be used to protect the private data (e.g., "at rest" data) and its processing (e.g., "in use" data) from marketplace application 410, any OS/firmware, and the cloud services provider.

Secure transactions execute over authenticated channels between secure world 120 and participants (e.g., seller device 240 or buyer device 250) for protecting private data (e.g., "in transit" data). For example, in response to a request from buyer device 250, marketplace application 400 may retrieve encrypted private data 440, add public data, and provide public and encrypted private product data 450 to buyer device 250. The secure enclave provider may also provide an attestation functionality 460 that the participants (e.g., seller device 240 or buyer device 250) can use to independently verify that the secure enclave is executing on trusted hardware and attest to the integrity of code executing in the secure enclave as the one that was audited by the participants prior to its deployment.

Figure 5A:
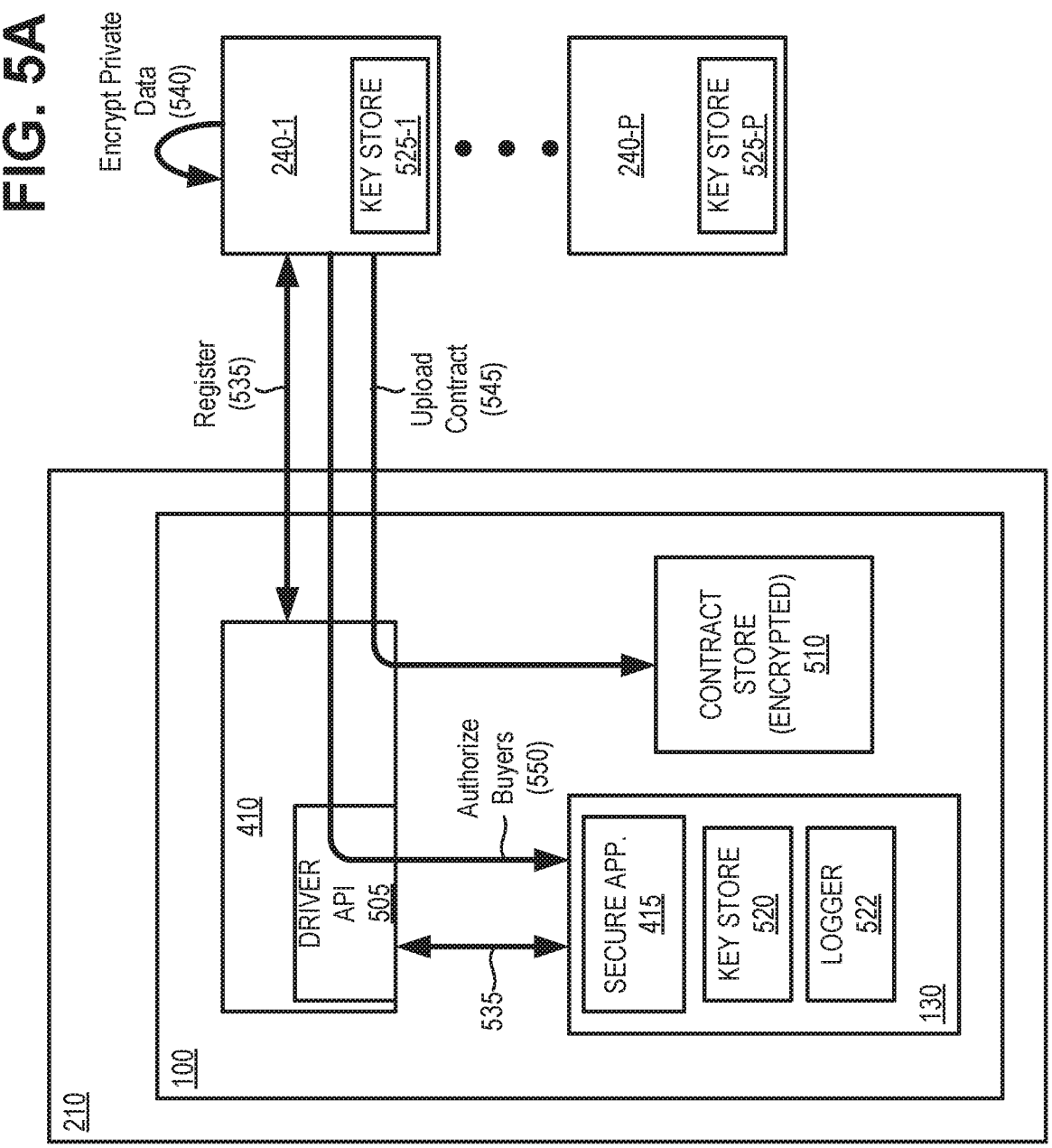
FIG. 5A is a diagram of exemplary communications for uploading private data for an application hosted on a cloud platform using a trusted execution environment (TEE), according to an implementation described herein.
Figure 5C:
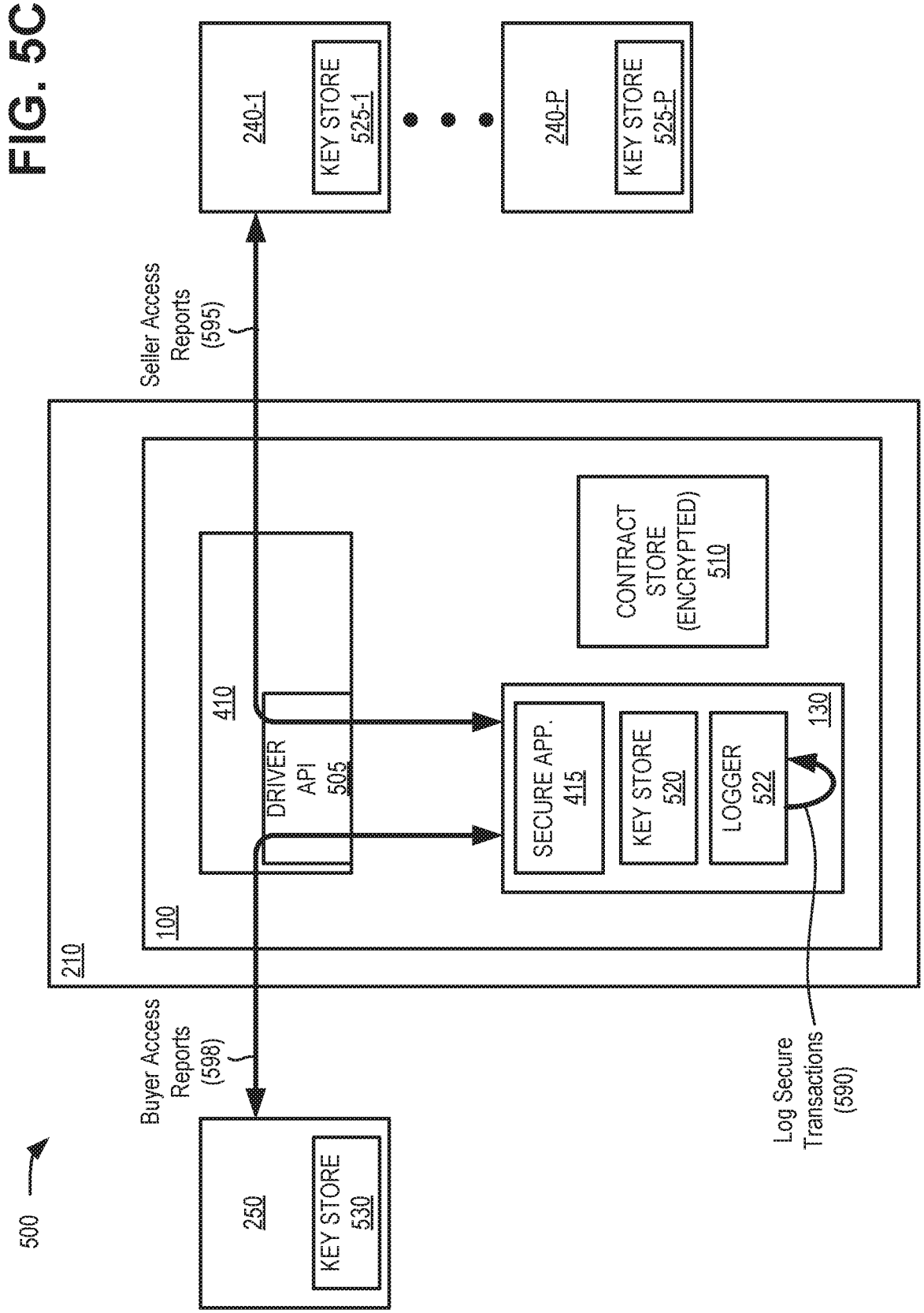
FIG. 5C is a diagram of exemplary communications for sellers and buyers to obtain records of private data use on a cloud platform using a TEE, according to an implementation described herein.

FIGS. 5A-5C are exemplary diagrams of a portion 500 of network environment 200. Network portion 500 may include seller devices 240, buyer devices 250, and network element 100. Network element 100 may include marketplace application 410, TEE instance 130, and a contract store 510.

In the example of FIGS. 5A-5C, each of seller devices 240 and buyer devices 250 may be configured with a browser-based client (e.g., software) to interact with marketplace application 410. Assume seller devices 240 are used by sellers (not shown) selling products or term-defined services. Further, assume the marketplace provider (operating both cloud platform 210 and marketplace application 410) is also one of the sellers. A seller may offer generic product contracts for all buyers or specific contracts with private data for specific buyers. The private seller contracts may be uploaded, with corresponding public information, to marketplace application 410. Buyer devices 250 are used by buyers (not shown) reviewing and buying products or term-defined services offered by sellers. Buyer device 250 may search for products using search criteria, over the public and the private data in contracts provided by the sellers.

Marketplace application 410 may include an application (e.g., software) that interfaces with TEE instance 130 and provides, to buyer devices 250, product listings and the relevant sellers' encrypted private data. For example, marketplace application 410 may receive application programming interface (API) requests from a buyer device 250 for searching and listing products. Marketplace application 410 may also provide an API to seller devices 240 to upload contracts.

Marketplace application 410 may additionally include driver API 505. Driver API 505 may be integrated with marketplace application 410 for exclusively managing communications with the TEE instance 130. According to an implementation, all communications between marketplace application 410 and TEE instance 130 are conducted through driver API 505.

Contract store 510 may include a database (e.g., in memory 330 or mass storage 340) to store contracts (e.g., including public and private data) uploaded by seller devices 240 in cloud platform 210. Private data in the contracts is encrypted, thus providing secure "at rest" data storage. Contract store 510 may include, for example, a separate storage components in (or associated with) cloud platform 210. Access to contract store 510 may be restricted to specific functions, such as, for example, receiving query requests from authorized buyers.

TEE instance 130 may include secure application 415, key storage 520, and a logger 522. Secure application 415 may correspond to, for example, secure application 132 of FIG. 1. Secure application 415 may implement a receiver for driver API 505 to provide the functionality of encryption, decryption and processing of private data. Secure application 415 may be signed and deployed. According to one implementation, the code of secure application 415 may be audited by participants (e.g., buyers and sellers) to verify that the code matches the intent of the participants (e.g., to prevent unauthorized access to private data).

Key storage 520 may store private keys within TEE instance 130. Key storage 520 may correspond, for example, to cryptography library 134 described above. For example, key storage 520 may allow keys to be stored with read-write access limited to secure application 415 within TEE instance 130. Seller devices 240 may use key store 525 and buyer devices 250 may use key store 530 to store corresponding public and private keys. The public keys may be used by respective end devices 240/250 to encrypt, and the private keys to decrypt, private data delivered to/from TEE instance 130. Generally, public keys are used to convert/encrypt data to an unreadable form, while private keys are used to convert received data back to a readable form. These keys help to ensure the security of the exchanged data. Data encrypted with a public key cannot be decrypted without using the corresponding private key.

Logger 522 may log each exchange of secure data (e.g., between TEE instance 130 and marketplace application 410). Logger 522 may map each exchange to a user identifier (e.g., an individual's buyer/seller ID), an organization name (e.g., corporate buyer/seller ID), a container or TEE instance ID, and/or a timestamp.

FIG. 5A is a diagram of exemplary communications for a seller to upload private data in network portion 500. A seller using a browser-based client on seller device 240 may register 535 to the cloud platform 210 and create an account. As part of the seller registration activity, seller device 240 may create a new seller key pair and securely store a private key of the seller key pair in key store 520 of TEE instance 130 and store the public key on the client key store 525 of the seller device 240.

Once a seller has registered, seller device 240 may upload a product contract (or term-defined service details) to a network element 100 in cloud platform 210. According to one implementation, uploading a contract may include steps of encrypting private data 540, uploading 545, and authorizing 550. For example, as shown by reference 540, private data in the contract (e.g., pricing, incentives, discount percentages, volume discounts, applicable time periods, and other characteristics) can be replaced by an encrypted form on the seller's side (e.g., at seller device 240) before uploading the contract. Thus, the seller's contract may include a combination of public data and a private (encrypted) data. Seller device 240 may then upload the contract via a marketplace API to contract store 510, as indicated by reference 545. Seller device 240 may authorize one or more buyers (e.g., associated with buyer devices 250) to view the contract. For example, seller device 240 may provide a list of authorized buyers or identify individual buyers that are allowed to view the seller's product or service descriptions. Marketplace application 410 may solicit the seller authorization and store the seller authorization in TEE instance 130, as indicated by reference 550.

In FIG. 5A, communications for one seller device 240 is shown for simplicity. In practice, multiple seller devices 240 may perform similar communications to upload competing product or service descriptions.

FIG. 5B is a diagram of exemplary communications for a buyer to obtain query responses using private seller data in network portion 500. A buyer using a browser-based client on buyer device 250 may register 555 to the cloud platform 210 and create an account. As part of the buyer registration activity, buyer device 250 may create a new key pair and securely store a public key of the key pair in key store 520 of TEE instance 130 and store the private key on the client key store 530 of the buyer device 250.

According to an implementation, registration 555 may support role based access control (RBAC). RBAC may enable (a) creating sub-organizations within a business participant organization; (b) creating roles within a business participant organization or sub-organization; (c) creating users within a business participant organization or sub-organization; (d) assigning roles to users within a business participant organization or sub-organization; and (e) assigning access control policies to a role for specific attributes of protected data. This functionality may be provided, for example, by creating hierarchical keys derived from business participant keys.

Once a buyer has registered, buyer device 250 may log in to the marketplace portal and submit a search query 560 for products based on search criteria such as address, product description, product type, price range, service level agreement (SLA) attributes/thresholds and/or service term. Marketplace application 410 may perform a search 565 of contract store 510 for contracts that are responsive to search query 560. According to an implementation, marketplace application 410 may restrict/enable search results to contracts that sellers have previously authorized to be viewed by the buyer.

After retrieving relevant contracts from contract store 510, marketplace application 410 may send a driver API call 570 to TEE instance 130. Driver API call 570 may include encrypted private data from the relevant contracts, a seller identifier for each contract, and a buyer identifier. Secure application 415 in TEE instance 130 may receive driver API call 570 and may validate that the requesting buyer is authorized to view private data. Assuming validation, secure application 415 may use the seller's private key to decrypt the private data included in driver API call 570. As shown at reference 575, using the decrypted data, secure application 415 may perform processing consistent with the aggregated data (e.g. applying discount to the pricing data based on volume, buyer location, etc.) and re-encrypt the resulting data with the buyer's public key from key store 520. Secure application 415 may then return the re-encrypted data (e.g., including modified data and/or different encryption from the original private data) to the marketplace application 410 via driver API response 580.

Marketplace application 410 may receive API response 580 and may prepare the combined encrypted and unencrypted data for presentation. Marketplace application 410 may send the prepared data to buyer device 250, as query response 585, in response to the buyer's request (e.g., query 560). Query response 585 may include metadata associated with each stock keeping unit (SKU)/service descriptor as well as categories created across sellers for presentation to a client/buyer. According to one implementation, query response 585 also can be rendered in a "wizard" style drag and drop visualization or a CAD style "assembly" of the components to create multi-vendor service chaining.

Buyer device 250 may receive query response 585 from marketplace application 410 and present the data to a user/buyer. A browser client script may be used to decrypt the private data from query response 585 using the buyer's private key in key store 530 and present the unencrypted information to the buyer in a browser view.

FIG. 5C is diagram of exemplary communications for sellers and buyers to obtain records of private data use within network portion 500. As shown in FIG. 5C, logger 522 in TEE instance 130 may log activity relating to secure data. For example, logger 522 may log 590 each time a secured object is retrieved, such as each API response 580 (FIG. 5B). In another implementation, logger 522 may log each registration 535/555 (FIGS. 5A and 5B), upload 545 (FIG. 5A), authorization (FIG. 5B), or search 565 (FIG. 5B). Logger 522 may map each TEE instance access to a buyer/seller username, organization name, container/TEE instance 130 name, and timestamp. Logger 522 may provide access reports that are encrypted with the seller(s) and/or buyer keys. For example, TEE instance 130 (e.g., longer 522) may provide a seller access report 595 to a particular seller (e.g. seller device 240-1) associated with certain private data, and a different seller access report 595 to another particular seller (e.g. seller device 240-p) associated with different private data. Similarly, TEE instance 130 (e.g., logger 522) may provide a buyer access report 598 to a particular buyer (e.g., buyer device 250) that logs use of the buyer's public key. Seller access report 595 and buyer access report 598 may be presented via a browser-based client of seller device 240 or buyer device 250, for example, on demand, in a periodic report, or upon an access event.

Although FIGS. 4-5C shows exemplary communications for securely computing private data in a cloud environment, in other implementations more, fewer or different communications may be used.

Figure 6:
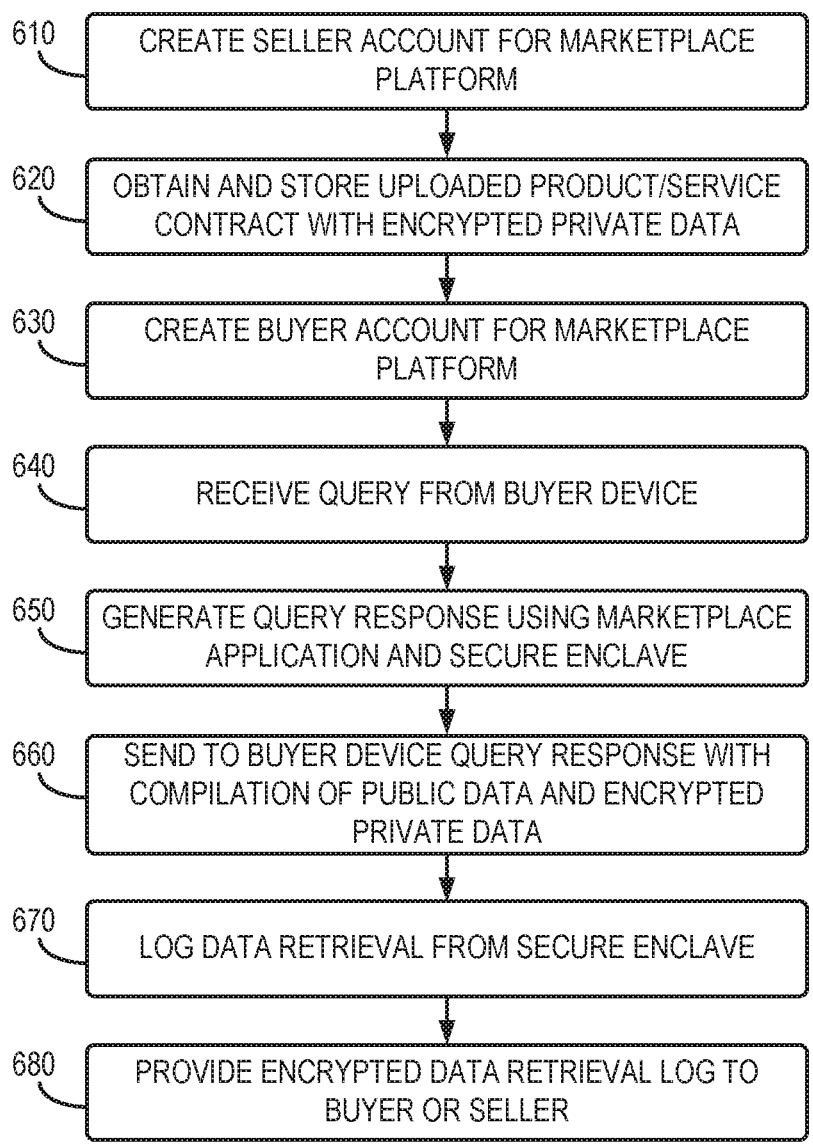
FIGS. 6 and 7 are a flow diagrams illustrating an exemplary process for securely computing private data for an application hosted on a cloud platform.

FIG. 6 is a flow diagram illustrating an exemplary process 600 for securely computing private data in a cloud environment. In one implementation, process 600 may be performed by network element 100. In another implementation, some or all of process 600 may be performed by network element 100 in conjunction with another device or group of devices, such as seller device 240 or buyer device 250.

As shown in FIG. 6, process 600 may include creating a seller account for a marketplace platform (block 610) and obtaining and storing an uploaded product/service contract with encrypted private data (block 620). For example, network element 100 may instantiate a normal world 110 and a secure world 120 (e.g., that includes TEE instance 130) to provide transactional services for end devices 240/250 associated with customers. A seller, using seller device 240, may create an account with cloud platform 210. Creating the account may include creating a new seller key pair for exchanging encrypted data. The private key of the seller key pair may be stored in TEE instance 130, while the public key of the seller key pair may be stored, for example, on seller device 240. A registered seller device 240 may upload contracts for products or services that include a combination of public data and encrypted private data. The customer may provide and/or agree to privacy settings for the contract data. The privacy setting may identify, for example, particular data fields or data within particular fields that will remain encrypted on network element 100, except for operations within secure world 120/TEE instance 130.

Process 600 may further include creating a buyer account for the marketplace platform (block 630) and receiving a query from a buyer device (block 640). For example, a buyer, using buyer device 250, may create an account with cloud platform 210. Creating the account may include creating a new buyer key pair for exchanging encrypted data. The public key of the buyer key pair may be stored in TEE instance 130, while the private key of the buyer key pair may be stored, for example, on buyer device 250. A registered buyer device 250 may log into marketplace application 410 on cloud platform 210 to search for (or request a list of) products available to the buyer. Using an API call, buyer device 250 may submit, to marketplace application 410, a query that includes search terms for public and/or private buyer data.

Process 600 may additionally include generating a query response using a marketplace application and a TEE instance (block 650) and sending, to the buyer device, the query response including a compilation of public data and encrypted private data (block 660). For example, in response to the API query from buyer device 250, marketplace application 410 may retrieve buyer-eligible contracts (e.g., partially-encrypted contracts) from contract store 510. Using driver API 505, marketplace application 410 may provide the retrieved contracts to TEE instance 130 for processing of pricing information (e.g., discounts, etc.). TEE instance 130 may perform processing (e.g., apply discounts, offers, etc.) of each contract, re-encrypt private data (e.g., using the buyer's encryption key), and return an API response with partially-encrypted contracts to marketplace application 410 for forwarding to buyer device 250.

Process 600 may also include logging data retrieval from the TEE instance (block 670) and providing an encrypted data retrieval log to a buyer or seller (block 680). For example, TEE instance 130 may log API responses and other transactions performed by TEE instance 130. TEE instance 130 may provide encrypted logs to buyers or sellers, for example, periodically, upon request, or whenever a data transaction occurs.

Figure 7:
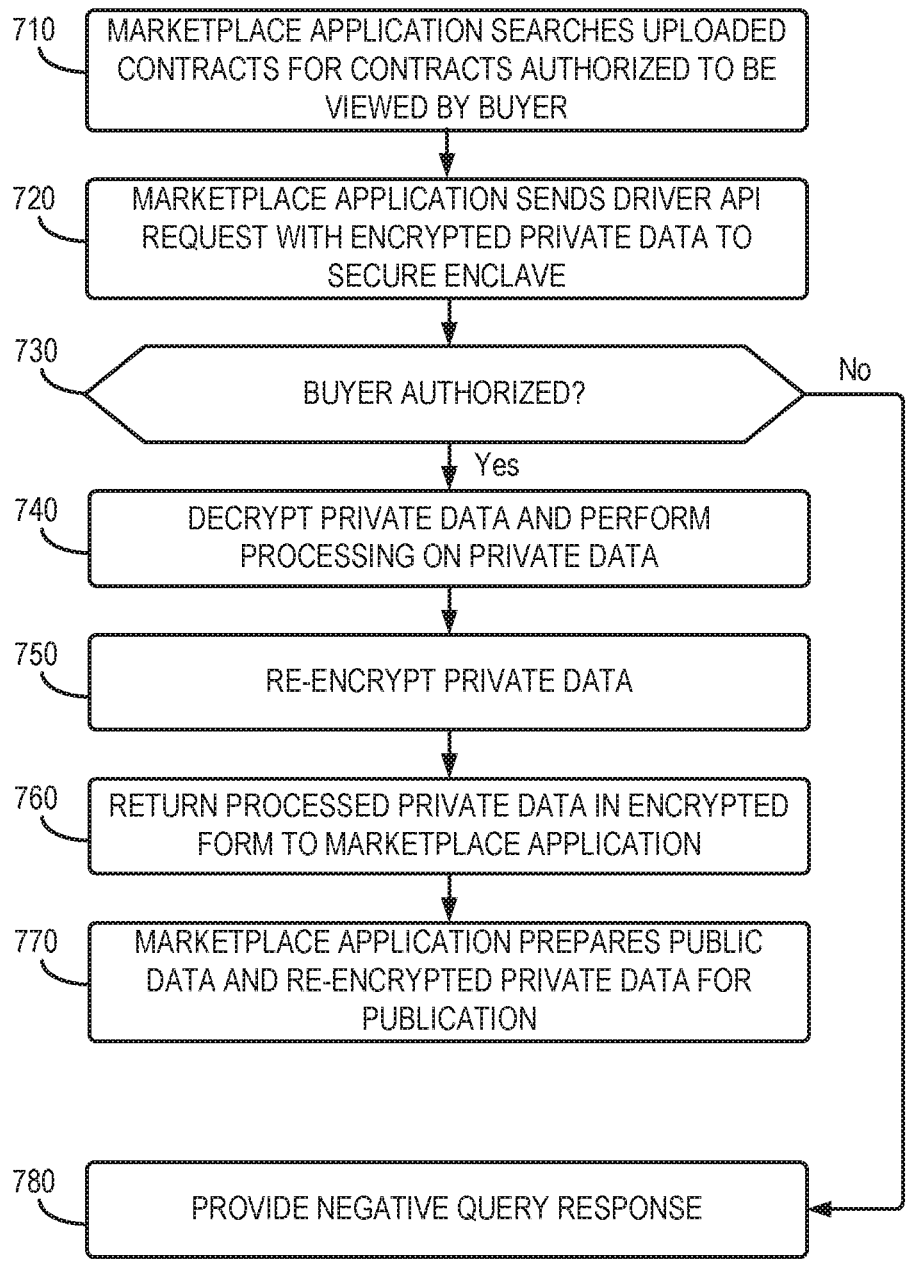

FIG. 7 shows processing associated with block 650. As shown in FIG. 7, process block 650 may include searching uploaded contracts for contracts authorized to be viewed by the buyer (block 710) and sending a driver API request with the encrypted private data to a TEE instance (block 720) For example, based on the buyer's query, marketplace application 410 may pull relevant contracts from contract store 510. Marketplace application 410 may send an API call (e.g., driver API call 570) to TEE instance 130. The API call may include encrypted private data from the relevant contracts, a seller identifier, a buyer identifier, and processing instructions for applying discounts, incentives, etc. that may alter pricing or other private data).

Process block 650 may also include verifying whether the buyer is authorized to view private data in the selected contract (block 730). For example, TEE instance 130 may verify that the buyer indicated in the API call is authorized in the sellers' contract and has a valid buyer encryption key in key store 520. If the buyer is not authorized to view the private data (block 730—No), process block 650 may include providing a negative query response (block 780). For example, TEE instance 130 may respond (e.g., via API response 580) to marketplace application 410 that the buyer is not authorized or that there is no data responsive to the buyer's query.

If the buyer is authorized to view the private data (block 730—Yes), process block 650 may include decrypting private data and performing data processing on the private data (block 740), re-encrypting the processed private data (block 750), and returning the processed private data in encrypted form to the marketplace application (block 760). For example, a secure application 415 in TEE instance 130 may decrypt private data using the respective seller's stored key (e.g., from key store 520). Secure application 415 may use the unencrypted data to apply search criteria (e.g., from the buyer's query), apply discounts (e.g., for volume, timing, introductory pricing, etc.), etc. After processing is complete, secure application 415 may re-encrypt the processed private data using the buyer's store encryption key. In an API response, secure application 415 may provide the updated encrypted, processed private data values to marketplace application 410.

Process block 650 may additionally include the marketplace application preparing the public data and the re-encrypted private data of the contract for publication (block 770). For example, marketplace application 410 may receive the updated encrypted private data values and prepare the combined encrypted and unencrypted data for presentation to the buyer (e.g., on buyer device 250).

Figure 8:
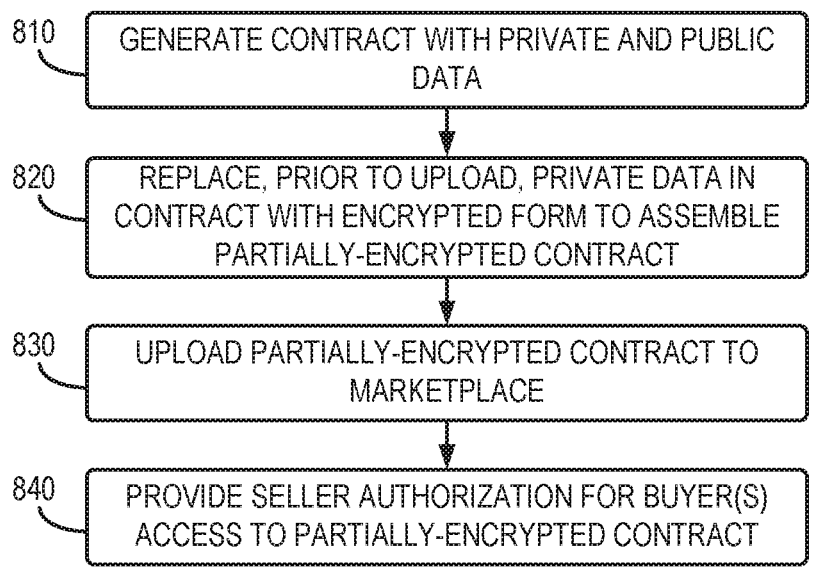
FIG. 8 is a flow diagram illustrating an exemplary process for uploading a contract with private data in a cloud environment, according to an implementation described herein.

FIG. 8 is a flow diagram illustrating an exemplary process 800 for uploading a contract with private data in a cloud environment. In one implementation, process 800 may be performed by seller device 240. In another implementation, some or all of process 800 may be performed by seller device 240 in conjunction with another device or group of devices, such network element 100.

Process 800 may include generating a contract with private and public data (block 810), and replacing, prior to an upload, private data in the contract with an encrypted form (block 820). For example, a seller may locally draft a contract that includes a description, discount terms, and pricing. The contract may be generated, for example, on a seller device 240 based on software or templates that incorporate SDKs provided by network element 100. The discount terms and pricing, for example, may be designated as private data, while the remainder of the contract may be designated as public information. The private data may be encrypted with a public key (e.g., from key store 525) assigned during the seller's registration with cloud platform 210 and a token or placeholder inserted in the contract (e.g., for formatting).

Process 800 may also include uploading the partially encrypted contract (block 830), and providing seller authorization for one or more buyers to access the partially-encrypted contract (block 840). For example, using an API from marketplace application 410, seller device 240 may upload the contract with the encrypted private data to network element 100 (e.g., contract store 510) via marketplace application 410. Additionally, seller device 240 may provide an indication of which buyers are authorized to access the contract. For example, a seller may indicate the uploaded contract is to be viewed by particular registered buyers or categories of buyers.

Systems and methods described herein provide a comprehensive secure cloud compute environment. The systems and methods provide a protection of private data for all business participants in an e-commerce transaction, including the cloud platform provider and other business participants. Data protection is provided for "at rest," "in transit," and "in use" data on a cloud platform.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, while examples described herein have been primarily described in the context of transactional data with private customer information, implementations described herein may apply to other types of data exchanges that include private information. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6-8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software (e.g., software 335).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 320) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by claims.

What is claimed is:

1. A method, comprising:
    obtaining, by an application executed on a network element, a product or service description from a first user, wherein the product or service description includes a combination of public data and encrypted private data based on a first encryption key;

receiving, by the application, a query from an end device of a second user;

retrieving, by the application, the product or service description from a memory;

forwarding, by the application, the product or service description to a trusted execution environment (TEE) instance;

decrypting, by the TEE instance, the encrypted private data of the product or service description;

processing, by the TEE instance, the private data of the product or service description;

re-encrypting, by the TEE instance and after the processing, the private data with a second encryption key;

sending, by the TEE instance and to the application, the re-encrypted private data;

assembling, by the application, the re-encrypted private data and the public data into a query response for presentation on the end device; and sending, by the application and to the end device, the query response including the re-encrypted private data and the public data.

2. The method of claim 1, further comprising:

storing, in the TEE instance, account information and the first encryption key associated with the first user; and storing, in the TEE instance, account information and the second encryption key associated with the second user, wherein decrypting the encrypted private data of the product or service description includes using the first encryption key, and wherein re-encrypting the private data includes using the second encryption key.

3. The method of claim 1, further comprising:

storing the first encryption key in the TEE instance, and storing a second encryption key in the TEE instance.

4. The method of claim 1, further comprising:

storing, by the application and in a memory outside of the TEE instance, the product or service description with other product or service descriptions from other users.

5. The method of claim 1, further comprising:

logging, by the TEE instance, sending of the re-encrypted private data; and sending, by the TEE instance and to the seller, an encrypted record of the logging.

6. The method of claim 1, wherein the encrypted private data includes characteristics for the product or service, and wherein the re-encrypted private data includes modified characteristics.

7. The method of claim 1, wherein processing the private data includes modifying a value associated with the product or service description based on instructions in the product or service description.

8. The method of claim 1, wherein obtaining the product or service description further comprises:

obtaining, from the seller, an indication of parties that are authorized to view the product or service description.

9. The method of claim 1, wherein the TEE instance uses a separate memory and operating system from the application.

10. The method of claim 1, wherein sending the query response further comprises:

sending the query response to a client application on the end device that can decrypt the re-encrypted private data.

11. A network device, comprising:

a first memory to store instructions for an application server;

a second memory to store instructions for a trusted execution environment (TEE) instance;

a first processor configured to execute instructions stored in the first memory to:

obtain a product or service description from a first user, wherein the product or service description includes a combination of public data and encrypted private data based on a first encryption key, receive a query from an end device of a second user, retrieve, based on the query, the product or service description, and forward the product or service description to the TEE instance; and a second processor configured to execute instructions stored in a second memory to:

decrypt the encrypted private data of the product or service description, process the private data of the product or service description, re-encrypt, after the processing, the private data with a second encryption key, and send, to the application, the re-encrypted private data, wherein the first processor is further configured to execute instructions stored in the first memory to:

assemble the re-encrypted private data and the public data into a query response for presentation on the end device, and send, to the end device, the query response including the re-encrypted private data and the public data.

12. The network device of claim 11, wherein, when decrypting the encrypted private data of the product or service description, the second processor is further configured to execute the instructions stored in the second memory to:

retrieve the first encryption key stored in the TEE instance.

13. The network device of claim 11, wherein, when re-encrypting private data, the second processor is further configured to execute the instructions stored in the second memory to:

retrieve, from the second memory, the second encryption key, associated with the second user, in the TEE instance.

14. The network device of claim 11, wherein the first processor is further configured to execute the instructions stored in the first memory to:

store, in another memory outside the TEE instance, the product or service description with other product or service descriptions from other users.

15. The network device of claim 11, wherein the second processor is further configured to execute the instructions stored in the second memory to:

log the sending of the re-encrypted private data; and send, to the first user, an encrypted record of the logging.

16. The network device of claim 11, wherein the encrypted private data includes characteristics of the product or service, and wherein the re-encrypted private data includes modified characteristics.

17. The network device of claim 11, wherein, when processing the private data, the second processor is further configured to execute the instructions stored in the second memory to:

modify a value associated with the product or service description based on instructions in the product or service description.

18. One or more non-transitory computer-readable medium storing instructions executable by a computational device to:
- obtain, by an application, a product or service description from a first user, wherein the product or service description includes a combination of public data and encrypted private data based on a first encryption key;
- receive, by the application, a query from an end device of a second user;
- retrieve, by the application and based on the query, the product or service description;
- forward the product or service description to a TEE instance for decryption of the encrypted private data, processing of the private data, and re-encryption of the private data with a second encryption key;
- receive, by the application, the re-encrypted private data from the TEE instance;
- assemble, by the application, the re-encrypted private data and the public data into a query response for presentation on the end device; and
- send, by the application and to the end device, the query response including the re-encrypted private data and the public data.

19. The non-transitory computer-readable medium of claim 18, wherein the instructions are further executable by a computational device to:
- solicit, from the first user, an indication of authorized users associated with the product or service description.

20. The non-transitory computer-readable medium of claim 18, wherein the TEE instance uses a separate memory and operating system from the application.

* * * * *